3,262,959
LITHIUM TETRAVINYLALUMINUM BIS(DIETHYL ETHERATE)
James M. Riddle, Baton Rouge, La., assignor to Ethyl Corporation, New York, N.Y., a corporation of Virginia
No Drawing. Filed June 22, 1964, Ser. No. 378,487
2 Claims. (Cl. 260—448)

This invention relates to a novel compound and to its production. More particularly it relates to lithium tetravinylaluminum bis(diethyl etherate) and to a novel process by which this material can be synthesized.

Lithium tetravinylaluminum bis(diethyl etherate) has the formula $LiAl(CH=CH_2)_4 \cdot 2(C_2H_5)_2O$. It generally exists as an orange-colored, viscous, semi-solid substance and is appreciably soluble in certain inert, anhydrous organic solvents such as ethers. On exposure to moisture and other hydroxylic substances, lithium tetravinylaluminum evolves a gas consisting largely of ethylene and is thus useful as a convenient source of this unsaturated hydrocarbon. It is also a powerful reducing agent and can be used as an ingredient in the formation of Ziegler catalysts for olefin polymerization, as in the formation of polyethylene, polypropylene and related polymeric materials.

To prepare this novel compound, anhydrous aluminum chloride, dissolved in a suitable ether such as diethyl ether, is added to vinyllithium which is also dissolved in a suitable ether such as diethyl ether. The reaction is preferably conducted under ambient temperature and pressure conditions (e.g., room temperature, atmospheric pressure) and under anhydrous conditions. Reaction proceeds readily as evidenced by the continuous precipitation of lithium chloride during the addition. The organic phase is separated from the precipitate and is then evaporated (preferably under reduced pressure and at room temperature) to provide the product of this invention in essentially pure, isolated form.

The relative proportions of vinyllithium and aluminum chloride are not critical although, generally speaking, best results are achieved when they are employed in approximately stoichiometric quantities.

In an actual experiment utilizing the foregoing procedure, a solution of 3.4 grams of aluminum chloride dissolved in 50 ml. of diethyl ether was added slowly to a stirred solution of 3.4 grams of vinyllithium in 50 ml. diethyl ether at room temperature. A finely divided white solid precipitated continuously during the addition. After 15 minutes' additional stirring, the solid was separated by centrifuging and washed with diethyl ether and dried. The recovered solid weighed 2.95 grams, and analysis showed it to be lithium chloride. Evaporation of the ether solution from the reaction under reduced pressure (0.1–0.05 mm.) at room temperature yielded, after repeated extraction with petroleum ether, an orange-yellow semi-solid material which, on analysis was found to correspond to the formula $LiAl(CH=CH_2)_4 \cdot 2(C_2H_5)_2O$.

Methods for preparing the reactants used in the process of this invention are reported in the literature. Thus, vinyllithium may be prepared by the reaction of phenyllithium with tetravinyltin in ether (D. Seyferth and M. A. Weiner, Chemistry and Industry 1959, 402).

What is claimed is:
1. Lithium tetravinylaluminum bis(diethyl etherate).
2. A process for the production of lithium tetravinylaluminum bis(diethyl etherate) which comprises introducing a solution of aluminum chloride in diethyl ether into a solution of vinyllithium in diethyl ether and isolating the lithium tertavinylaluminum diethyl etherate from the resultant system.

No references cited.

TOBIAS E. LEVOW, *Primary Examiner.*
REUBEN EPSTEIN, *Examiner.*
L. A. SEBASTIAN, *Assistant Examiner.*